(12) United States Patent
Fukugawa et al.

(10) Patent No.: US 11,394,869 B2
(45) Date of Patent: Jul. 19, 2022

(54) IMAGING DEVICE WITH FOCUSING OPERATION BASED ON SUBJECT AND PREDETERMINED REGION

(71) Applicant: Panasonic Intellectual Property Management Co., Ltd., Osaka (JP)

(72) Inventors: Kohei Fukugawa, Osaka (JP); Naoko Takeda, Osaka (JP); Masahiro Murakami, Kyoto (JP); Kuniyoshi Kobayashi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/932,714

(22) Filed: Jul. 18, 2020

(65) Prior Publication Data

US 2021/0075972 A1 Mar. 11, 2021

(30) Foreign Application Priority Data

Sep. 6, 2019 (JP) .............................. JP2019-163189

(51) Int. Cl.
*H04N 5/232* (2006.01)
(52) U.S. Cl.
CPC . *H04N 5/232127* (2018.08); *H04N 5/232945* (2018.08)
(58) Field of Classification Search
None
See application file for complete search history.

(56) References Cited

U.S. PATENT DOCUMENTS

| 2004/0207743 | A1* | 10/2004 | Nozaki | H04N 5/232123 348/333.12 |
| 2008/0170132 | A1* | 7/2008 | Yi | H04N 5/23225 348/222.1 |
| 2010/0097515 | A1* | 4/2010 | Ishii | H04N 5/23218 348/349 |
| 2010/0149369 | A1* | 6/2010 | Yasuda | H04N 5/23219 348/222.1 |
| 2014/0176783 | A1* | 6/2014 | Shibagami | H04N 5/232945 348/349 |
| 2014/0362278 | A1* | 12/2014 | Kawarada | H04N 5/232123 348/349 |
| 2015/0181106 | A1* | 6/2015 | Komori | H04N 5/36961 348/349 |

(Continued)

FOREIGN PATENT DOCUMENTS

| JP | S61-028914 A | 2/1986 |
| JP | 2007-279601 A | 10/2007 |
| JP | 2017-224908 A | 12/2017 |

*Primary Examiner* — Twyler L Haskins
*Assistant Examiner* — Wesley J Chiu
(74) *Attorney, Agent, or Firm* — Renner, Otto, Boisselle & Sklar, LLP (57) ABSTRACT

An imaging device includes an imager configured to capture a subject to generate a captured image; a recognizer configured to recognize the subject on the captured image; and a controller configured to control a focusing operation based on a focusing region set on the captured image, wherein the controller, when the subject is recognized to be present in a first determination region in a state where the focusing region is set on a predetermined region fixedly arranged on the captured image, sets the focusing region depending on a recognition result of the recognizer instead of the predetermined region.

8 Claims, 9 Drawing Sheets

(56) References Cited

U.S. PATENT DOCUMENTS

| | | | |
|---|---|---|---|
| 2015/0229831 A1* | 8/2015 | Miyazawa | H04N 5/232127 348/222.1 |
| 2016/0191811 A1* | 6/2016 | Tsubusaki | H04N 5/23218 348/240.1 |
| 2017/0366739 A1* | 12/2017 | Iwasaki | H04N 5/232127 |
| 2019/0045133 A1* | 2/2019 | Tomosada | H04N 5/23219 |
| 2019/0320122 A1* | 10/2019 | Hasegawa | G02B 7/34 |

* cited by examiner

ELAPSE OF THE PREDETERMINED TIME OR MORE

FIG. 7C

IMAGING DEVICE WITH FOCUSING OPERATION BASED ON SUBJECT AND PREDETERMINED REGION

TECHNICAL FIELD

The present disclosure relates to an imaging device configured to perform a focusing operation.

BACKGROUND

Japanese Unexamined Patent Application Publication No. 2007-279601 discloses a digital camera having an autofocus (AF) function. The digital camera of Japanese Unexamined Patent Application Publication No. 2007-279601 includes an AF controller configured to control autofocus. The AF controller determines a focusing region, which is subject to a focusing operation, from a plurality of focusing regions set in a capture screen depending on an autofocus mode specified on an operating portion.

SUMMARY

The present disclosure provides an imaging device capable of setting a focusing region to a desired region depending on a position of a subject.

An imaging device of the present disclosure includes an imager configured to capture a subject to generate a captured image; a recognizer configured to recognize the subject on the captured image; and a controller configured to control a focusing operation based on a focusing region set on the captured image, wherein the controller, when the subject is recognized to be present in a first determination region in a state where the focusing region is set on a predetermined region fixedly arranged on the captured image, sets the focusing region depending on a recognition result of the recognizer instead of the predetermined region.

With the imaging device according to the present disclosure, when the subject enters the first determination region with the focusing region being set to the predetermined region, the focusing region is set depending on a recognition result of the recognizer instead of the predetermined region, thereby setting the focusing region to a desired region depending on the position of the subject.

DETAILED DESCRIPTION

Hereinafter, an embodiment will be described in detail with reference to the drawings as appropriate. However, more detailed description than necessary may be omitted. For example, detailed descriptions of already well-known matters and repeated descriptions for substantially the same configuration may be omitted. This is to avoid the following description from becoming unnecessarily redundant to facilitate understanding by those skilled in the art. The inventor(s) provides the accompanying drawings and the following description in order for those skilled in the art to fully understand the present disclosure, and the accompanying drawings and the following description are not intended to limit the subject matter described in the claims.

First Embodiment

In a first embodiment, as an example of an imaging device according to the present disclosure, a digital camera is described, which is configured to recognize a subject based on an image recognition technology and to control a focusing operation.

[1-1. Configuration]

A configuration of a digital camera according to the first embodiment is described with reference to FIG. 1.

Figure 1:
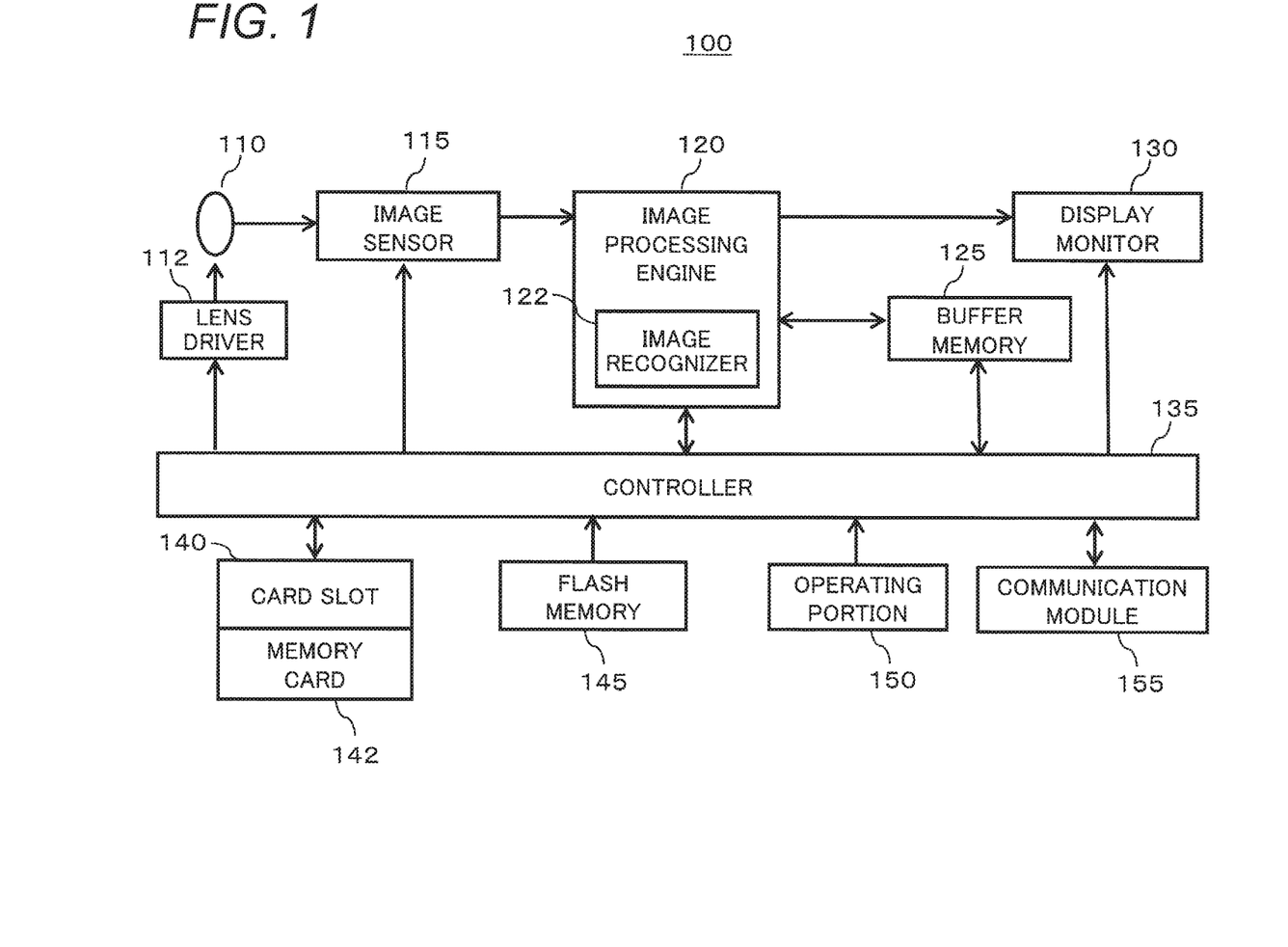
FIG. 1 is a diagram illustrating a configuration of a digital camera according to a first embodiment of the present disclosure.

FIG. 1 illustrates a configuration of a digital camera 100 according to the present embodiment. The digital camera 100 of the present embodiment includes an image sensor 115, an image processing engine 120, a display monitor 130, and a controller 135. Furthermore, the digital camera 100 includes a buffer memory 125, a card slot 140, a flash memory 145, an operating portion 150, and a communication module 155. Moreover, the digital camera 100 includes, for example, an optical system 110 and a lens driver 112.

The optical system 110 includes a focus lens, a zoom lens, an optical image stabilization lens (OIS), a diaphragm, and a shutter. The focus lens is a lens for changing a focus state of a subject image formed on the image sensor 115. The zoom lens is a lens for changing the magnification of a subject image formed on the image sensor 115. Each of the focus lens and the like is formed of a single lens or a plurality of lenses.

The lens driver 112 drives the focus lens and the like of the optical system 110. The lens driver 112 includes a motor to move the focus lens along an optical axis of the optical system 110 under control by the controller 135. The lens driver 112 for driving the focus lens can be realized with a DC motor, a stepping motor, a servomotor, an ultrasonic motor, or the like.

The image sensor 115 captures a subject image formed via the optical system 110 to generate capture data. The capture data includes image data indicative of a captured image of the image sensor 115. The image sensor 115 generates new image data of a new frame at a predetermined frame rate (e.g., 30 frames per second). A timing of generating new capture data and an operation of electronic shutter by the image sensor 115 are controlled by the controller 135. As the image sensor 115, various image sensors may be used including a CMOS image sensor, a CCD image sensor, an NMOS image sensor or the like.

The image sensor 115 executes a capturing operation of a still image, a capturing operation of a through image, or the like. The through image means mainly a moving image and is displayed on the display monitor 130 for a user to decide a composition for capturing a still image. The through image and the still image are both an example of a captured image according to the present embodiment. The image sensor 115 is an example of an imager according to the present embodiment.

The image processing engine 120 performs various types of processing on the capture data, which is output from the image sensor 115, to generate image data, and also performs various types of processing on image data to generate an image displayed on the display monitor 130. The various types of processing include, but not limited to, white balance correction, gamma correction, YC conversion processing, electronic zoom processing, compression processing, decompression processing, and the like. The image processing engine 120 may be a hardwired electronic circuit or may be a microcomputer, a processor, or the like that uses a program.

In the present embodiment, the image processing engine 120 includes an image recognizer 122 configured to perform a function of recognizing a subject by image recognition on the captured image. The image recognizer 122 will be described in detail below.

The display monitor 130 is an example of a display configured to display various types of information. For example, the display monitor 130 displays an image (for example, through image) indicated by image data, which is captured by the image sensor 115 and then subjected to the image processing by the image processing engine 120. Moreover, the display monitor 130 displays a menu screen or the like for the user to perform various types of setting on the digital camera 100. The display monitor 130 may be realized, for example, by a liquid crystal display device or an organic EL device.

The operating portion 150 is a general term for hardware keys including an operating button and an operating lever provided on an exterior of the digital camera 100 and configured to accept the user's manipulation. The operating portion 150 includes, for example, a release button, a mode dial, and a touch panel. Once the operating portion 150 receives the user's manipulation, the operating portion 150 transmits an operating signal corresponding to the user manipulation, to the controller 135.

The controller 135 collectively controls an entire operation of the digital camera 100. The controller 135 includes a CPU and the like, and the CPU executes a program (software) to achieve a predetermined function. The controller 135 may include, instead of the CPU, a processor realized by a dedicated electronic circuit designed to perform a predetermined function. That is, the controller 135 can be realized by various types of processors including a CPU, an MPU, a GPU, a DSU, an FPGA, and an ASIC. The controller 135 may be realized by a single or a plurality of processors. Moreover, the controller 135 may be realized by a single semiconductor chip together with the image processing engine 120.

The buffer memory 125 is a recording medium configured to function as a working memory for the image processing engine 120 or the controller 135. The buffer memory 125 is realized by a dynamic random access memory (DRAM) or the like. The flash memory 145 is a non-volatile recording medium. Although not illustrated, the controller 135 may have various types of internal memory, and may include, for example, a ROM. The ROM may store various programs for being executed by the controller 135. Moreover, the controller 135 may include a RAM configured to function as a working region of the CPU.

The card slot 140 is a unit for insertion of a memory card 142, which is detachable. The card slot 140 is electrically and mechanically connectable with the memory card 142. The memory card 142 is an external memory including a recording element, e.g., a flash memory. The memory card 142 can store data, e.g., image data, generated by the image processing engine 120.

The communication module 155 is a communication module (circuit) configured to perform communication compliant with IEEE802.11 communication standard, Wi-Fi standards, or the like. The digital camera 100 can communicate with a different device via the communication module 155. The digital camera 100 may directly communicate with a different device via the communication module 155 or may communicate with a different device via an access point. The communication module 155 may have a connection to a communication network, e.g., the Internet.

[1-1-1. Image Recognizer]

The image recognizer 122 of the present embodiment will be described below in detail.

The image recognizer 122 adopts, for example, a learned model using a neural network, e.g., a convolutional neural network. The image recognizer 122 inputs information indicative of captured image Im of the image sensor 115 to a learned model, and executes image recognition processing with the model. The image recognizer 122 is an example of a recognizer of the present embodiment. The image recognizer 122 may be formed of a collaboration of the image processing engine 120 and the controller 135. Moreover, the image processing engine 120 as the image recognizer 122 may output the amount of movement based on images input in time series.

The processing of the learned model of the image recognizer 122 outputs position information indicative of a region showing a subject classified into any of a plurality of preset categories, for example, on the input image Im in association with each category. The plurality of categories include, for example, portions of a human, e.g., the body, the face, and the eyes of a human, and portions of an animal, e.g., the body, the face, and the eyes of an animal. The position information is specified, for example, by a horizontal coordinate and a vertical coordinate on the image Im, which is subject to the processing, and indicates, for example, a region enclosing the recognized subject in a rectangular shape (dashed dotted line is illustrated in the figures).

The image recognizer 122 may simultaneously recognize up to the maximum preset number of subjects with respect to each category. Moreover, the aforementioned category of animals may be further divided depending on the types of animals.

The aforementioned learned model of the image recognizer 122 can be obtained through supervised learning that uses, as teaching data, image data associated with a correct answer label indicating that an image showing a subject of each category is correct. The learned model may generate reliability or likelihood regarding a recognition result of each category.

The learned model of the image recognizer 122 is not limited to a neural network, but may be a machine learning model related to various types of image recognition. Moreover, the image recognizer 122 may adopt not only machine learning, but also various types of image recognition algorithms. Moreover, the image recognizer 122 may be configured such that recognition with respect to a category, e.g., the face and the eyes of a human, is performed by rule-based image recognition processing. Moreover, the image recognizer 122 may recognize the movement of a subject using various types of algorithms, e.g., depth from defocus (DFD), tracking, and ME. The image recognizer 122 may be formed, for example, of a DSP. Moreover, the image recognizer 122 may be formed separately from the image processing engine 120, but may be formed with the controller 135 integrally.

[1-2. Operation]

An operation of the digital camera 100 configured as described above will be described below.

The digital camera 100 captures a subject image, which is formed via the optical system 110, with the image sensor 115 and generates capture data. The image processing engine 120 performs various types of processing on the capture data generated by the image sensor 115 and generates image data. The controller 135 records, on the memory card 142 attached to the card slot 140, the image data generated by the image processing engine 120 in the operation of capturing, for example, a still image.

Moreover, the digital camera 100 causes the display monitor 130 to display a through image in the operation of capturing a video or a still image. Based on the through image of the display monitor 130, the user can check a composition for taking a video or capturing a still image. While the through image is displayed, the controller 135 performs a focusing operation for controlling the lens driver 112 to drive the focus lens of the optical system 110. The focusing operation is automatically performed in the operation of capturing, for example, a video. In the operation of capturing a still image, the focusing operation is performed in response to manipulation of the release button by the user.

When the aforementioned focusing operation is performed, the digital camera 100 of the present embodiment recognizes a subject through image recognition with respect to the captured image Im, e.g., a through image, and sets the focusing region that indicates an image region of a range that is subject to focusing on the captured image Im depending on the recognized subject. The focusing region may be called an "AF frame". An overview of the operation of the digital camera 100 according to the present embodiment will be described with reference to FIGS. 2A and 2B.

Figure 2A:
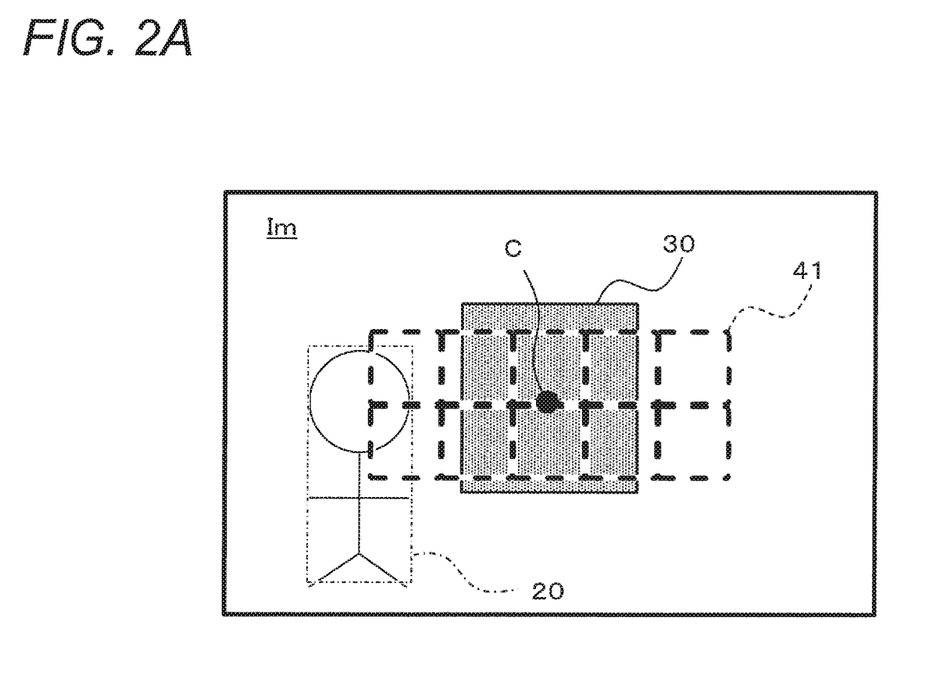
FIGS. 2A and 2B are views for describing an overview of operation of the digital camera according to the first embodiment.
Figure 2B:
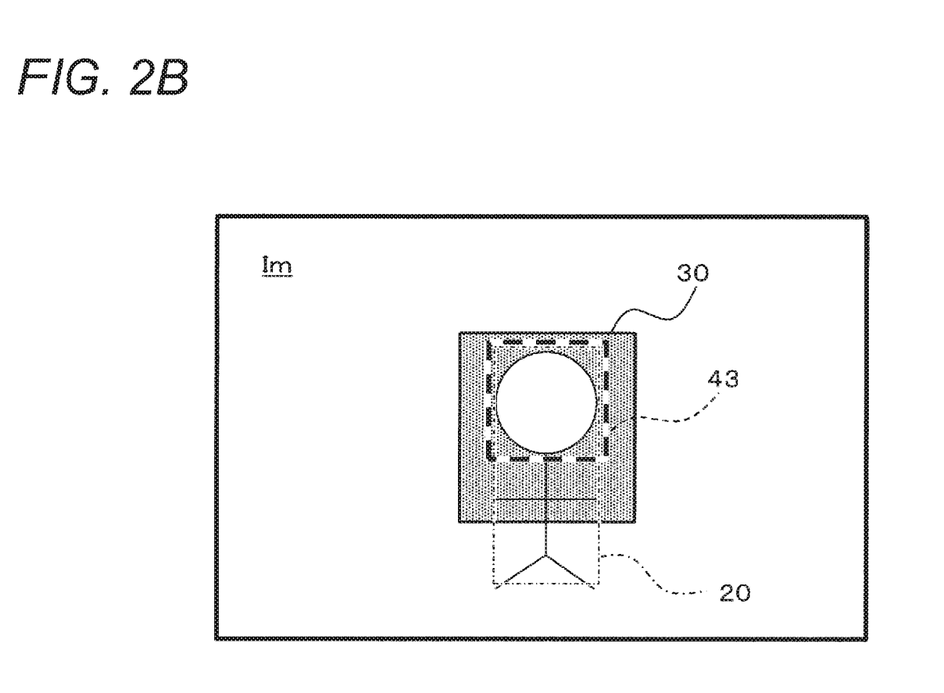

FIG. 2A illustrates an example of display of the display monitor 130 in which a subject 20 of the digital camera 100 is positioned away from the center of the captured image Im. FIG. 2B illustrates an example of display in which the subject 20 of FIG. 2A has approached the center of the captured image Im.

The digital camera 100 of the present embodiment sets a first determination region 30 on the captured image Im. The first determination region 30 is a region for deciding whether or not a focusing region set on the captured image Im should be depending on the position of the subject 20 at the time of execution of a multi-point AF mode, which will be described below. Coordinate information related to the position of the first determination region 30 is preliminarily stored in the flash memory 145. The first determination region 30 of the present embodiment is stored as a fixed region including a center C of the captured image Im and spreading in a rectangular shape from the center C.

In the example of FIG. 2A, the subject 20 is positioned outside the first determination region 30. Therefore, the digital camera 100 of the present embodiment arranges, i.e., sets, the focusing region on a multi-point area 41 on the captured image Im, and performs the focusing operation based on the multi-point area 41. The multi-point area 41 illustrated in FIG. 2A is a predetermined region fixedly arranged on the captured image Im to be used as a default focusing region in the multi-point AF mode. The multi-point area 41 is set as a region including the center C and having a horizontally long rectangular shape, internally divided into a plurality of regions each having a substantially square shape. When the focusing region is set on the multi-point area 41, the controller 135 performs the focusing operation for controlling the lens driver 112 based on an evaluation value, e.g., a contrast value, in each region of the multi-point area 41.

Such control can suppress focusing on the subject 20, when the subject 20 is present near an edge of the captured image Im as illustrating in FIG. 2A, that is, the subject 20 should not be focused. Using a wide region in the center of the captured image Im for the focusing region can focus other objects desired to be focused by the user, e.g., an object or background near the center of the captured image Im.

In the example of FIG. 2B, the subject 20 is in the first determination region 30. Therefore, the digital camera 100 of the present embodiment sets the focusing region on a subject area 43 for an automatic recognition AF mode, which will be described below, instead of the multi-point area 41. The subject area 43 is a region set depending on a result of recognition by the image recognizer 122 (the subject area 43 may be called "subject recognition region"). The subject area 43 is set as a region enclosing at least a portion (face in the present embodiment) of the subject 20 recognized on the captured image Im. The subject area 43 changes to follow the moving subject 20.

When the focusing operation is performed with the subject area 43 used for the focusing region, the controller 135 controls the lens driver 112 based on an evaluation value of the subject area 43. Such control can suppress focusing on other objects, e.g., background, even when the multi-point AF mode is set, as the subject 20 is present near the center on the captured image Im as illustrated in FIG. 2B, that is, the subject 20 should be focused, leading to focusing on the subject 20.

According to the aforementioned setting of the focusing region, when the subject 20 is present near an edge of the captured image Im as illustrated in FIG. 2A, other objects near the center of the captured image Im are preferentially focused. Then, when the subject 20 enters the center as illustrated in FIG. 2B, the focusing operation can be performed such that the subject 20 is preferentially focused. Such focusing operation leads to automatic setting and switching of the focusing region for a desired object when the multi-point AF mode is executed under circumstances in which various objects appear on the captured image Im, for example, wedding parties, sports festivals, fixed point observation in natural environment, or the like.

An operation of the digital camera 100 of the present embodiment will be described below in detail.

[1-2-1. Mode Setting]

The digital camera 100 of the present embodiment has a plurality of AF modes including the multi-point AF mode for setting the focusing region in a method as described above. Mode setting in the digital camera 100 of the present embodiment will be described with reference to FIG. 3.

Figure 3:
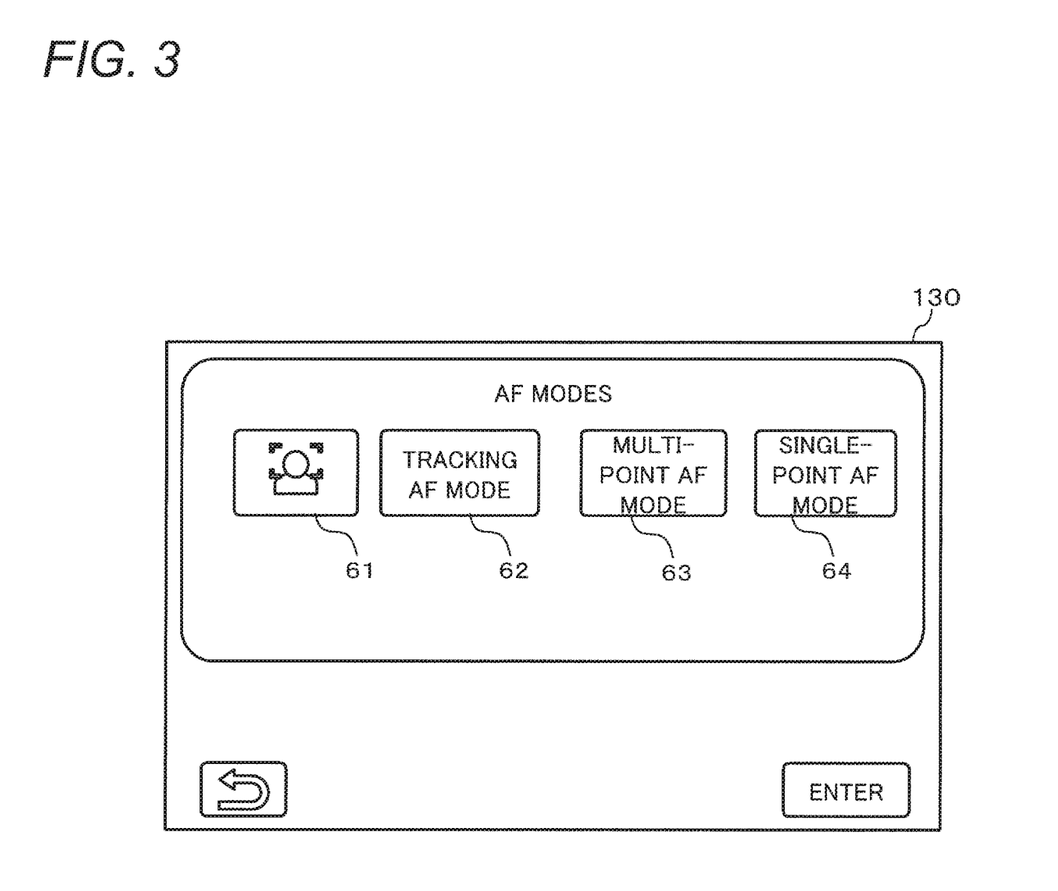
FIG. 3 is a view illustrating an example of display of a mode setting screen of the digital camera according to the first embodiment.

FIG. 3 illustrates an example of display of a mode setting screen of the digital camera 100 of the present embodiment.

In the example of FIG. 3, the display monitor 130 displays a plurality of setting keys 61 to 64 on an autofocus mode setting screen. The setting keys 61 to 64 are a selection manipulation portion for the user to select one AF mode from the plurality of AF modes of the digital camera 100.

For example, when one of the icons of the setting keys 61 to 64 displayed on the display monitor 130 is selected via the operating portion 150, an AF mode corresponding to the selected setting key 61 to 64 is executed.

In the example illustrated in FIG. 3, the setting keys 61, 62, 63, and 64 correspond to the automatic recognition AF mode, a tracking AF mode, the multi-point AF mode, and a single-point AF mode, respectively.

The automatic recognition AF mode corresponding to the setting key 61 is a mode for setting the focusing region depending on a recognition result of the image recognizer 122. In the automatic recognition AF mode, among subjects recognized by the image recognizer 122, a subject to be focused is selected by the controller 135 or the user, for example, and the focusing region is set on a subject area (shown in FIG. 2B) corresponding to the selected subject.

When the focusing region is set depending on a recognition result of the image recognizer 122, a region corresponding to at least a portion of the subject 20, e.g., face, entire body, eyes of the subject 20, may be used for the focusing region. In the present embodiment, a region corresponding to the face of the subject 20 is used for the focusing region.

The tracking AF mode corresponding to the setting key 62 is a mode for setting the focusing region such that the user selects an object on the captured image Im to follow a shape recognized by the image recognizer 122 which is similar to a shape of the selected object. Selection of an object may be executed, for example, when the user touches a region of an object displayed on the display monitor 130.

In contrast to the aforementioned automatic recognition AF mode and tracking AF mode, the multi-point AF mode corresponding to the setting key 63 and the single-point AF mode corresponding to the setting key 64 are modes for using a predetermined region fixedly arranged on the captured image Im as the focusing region.

In the multi-point AF mode, the multi-point area 41 fixedly arranged on the captured image Im is divided into a plurality of regions as illustrated in FIG. 2A, where an evaluation value such as contrast value is calculated in each of the divided regions and the focusing operation is performed based on a region having the best evaluation value, for example. In the single-point AF mode, the focusing operation is performed based on an evaluation value of an entire predetermined region fixedly arranged on the captured image Im, for example.

When the setting key 63 of the display monitor 130 is selected via the operating portion 150 and then the multi-point AF mode is set, the digital camera 100 of the present embodiment will execute the AF operation described above with reference to FIGS. 2A and 2B.

[1-2-2. Details of Operation]

Details of the operation of the multi-point AF mode of the digital camera 100 according to the present embodiment will be described with reference to FIGS. 4 to 7. As an example of the operation of the digital camera 100, an example operation of taking a video in the multi-point AF mode is described below. Note that the present disclosure can be applied not only to taking a video, but also to AFC (auto focus continuous) mode for taking a still image or taking a through image. The AFC mode is an operation mode for performing focusing operation in the digital camera 100 to keep focus adjusting when the release button is half-pressed, for example.

Figure 4:
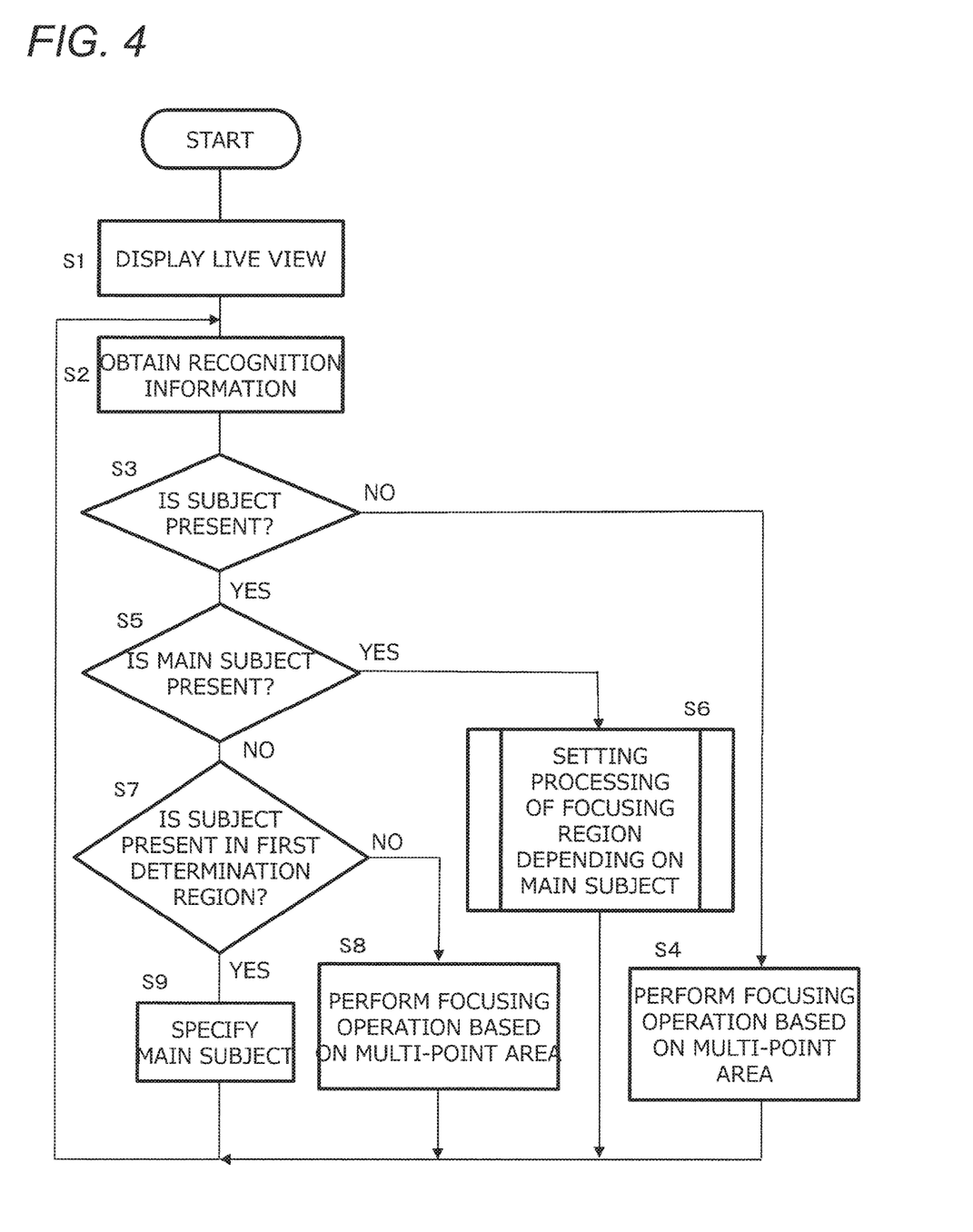
FIG. 4 is a flowchart illustrating an example of operation of a multi-point AF mode of the digital camera of the first embodiment.
Figure 5:
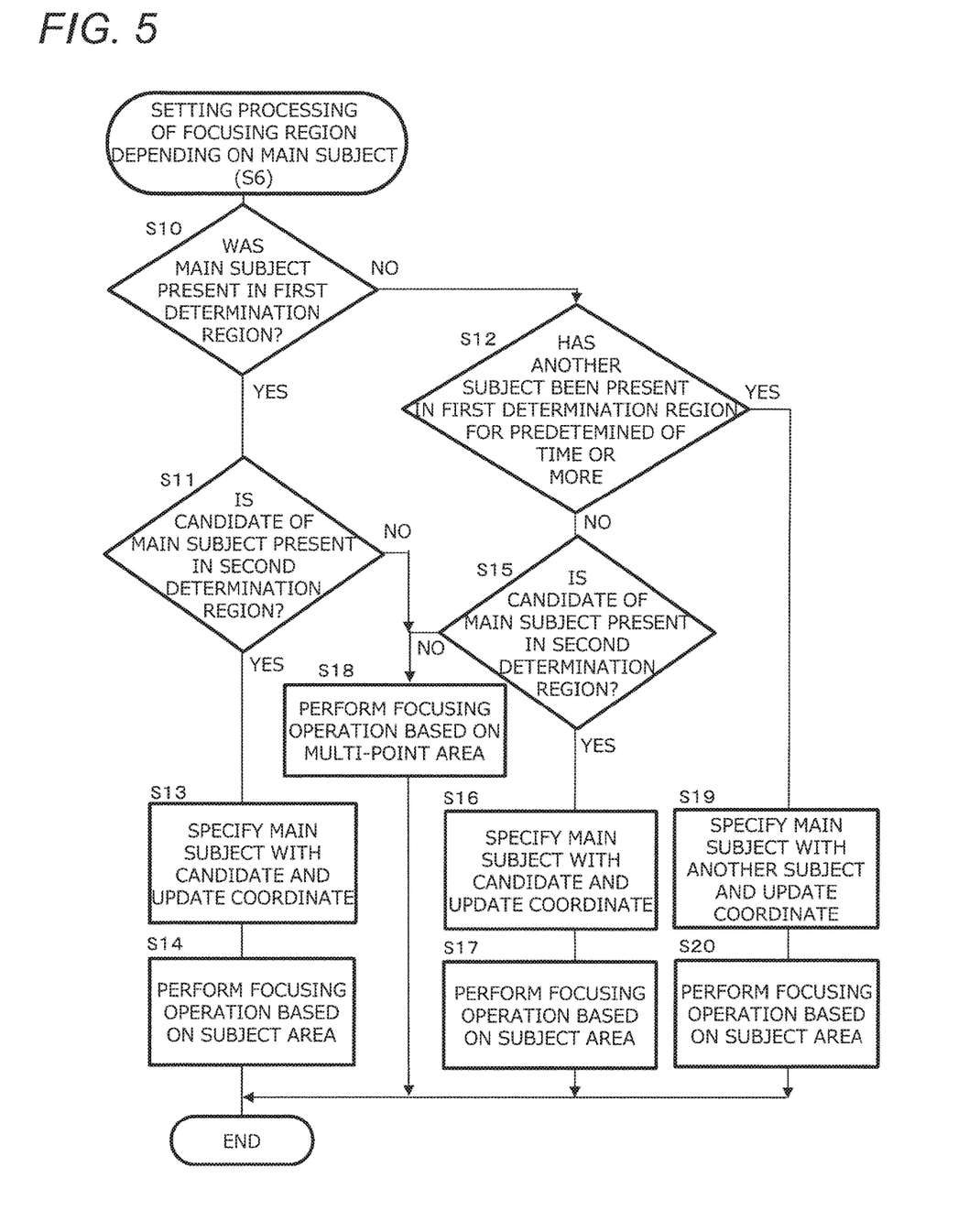
FIG. 5 is a flowchart illustrating an example of operation of the multi-point AF mode of the digital camera continued from FIG. 4.

FIGS. 4 and 5 are flowcharts each illustrating an example operation of the multi-point AF mode of the digital camera 100 according to the present embodiment.

Each processing of the flowcharts shown in FIGS. 4 and 5 is executed by the controller 135 of the digital camera 100.

First, the controller 135 controls the display monitor 130 to perform live view display when taking a video (S1). More specifically, a series of image data output from the image sensor 115 is sequentially displayed as a through image on the display monitor 130.

The controller 135 obtains recognition information from the image recognizer 122 (S2). The recognition information includes, for example, information regarding presence or absence of a subject recognized by the image recognizer 122 on the captured image Im. If there is a recognized subject, the recognition information includes position information (e.g., coordinates) of a region where the subject is recognized.

Based on the obtained recognition information, the controller 135 determines whether a subject recognized by the image recognizer 122 is present or not (S3).

When a subject recognized by the image recognizer 122 is absent (NO in S3), the controller 135 sets the focusing region on the multi-point area 41 (shown in FIG. 2A), which is a predetermined region fixedly arranged on the captured image Im, and performs the focusing operation based on the multi-point area 41 (S4).

When a subject recognized by the image recognizer 122 is present (YES in S3), the controller 135 determines whether a main subject is present or not (S5). The main subject is information specified by the controller 135 as a subject to be focused among subjects recognized by the image recognizer 122. When specifying the main subject, the controller 135 stores identification information of the main subject, e.g., position information of the main subject.

When step S5 is executed for the first time, the main subject has not been specified by the controller 135 (NO in S5). Therefore, the process proceeds to step S7. The controller 135 determines whether the subject recognized by the image recognizer 122 is present or not in the first determination region 30 (S7). When the subject 20 does not overlap with the first determination region 30 as illustrated in FIG. 2A, the subject 20 is determined not to be present in the first determination region 30. When the subject 20 overlaps with the first determination region 30 as illustrated in FIG. 2B, the subject 20 is determined to be present in the first determination region 30. Determination as to whether the subject 20 is present or not in the first determination region 30 may be made based on an area where the subject 20 overlaps the first determination region 30. The subject 20 may be determined to be present in the first determination region 30, for example, when a proportion of the overlapping region of the subject 20 and the first determination region 30 within the entire region of the subject 20 is a predetermined value or more.

When the subject 20 is determined not to be present in the first determination region 30 (NO in S7), the controller 135 sets the focusing region on the multi-point area 41 and performs the focusing operation (S8) as with step S4.

Meanwhile, when the subject 20 is determined to be present in the first determination region 30 (YES in S7), the controller 135 specifies the main subject (S9). More specifically, the main subject is specified with the subject 20 recognized by the image recognizer 122. The controller 135, when specifying the main subject, records the identification information, e.g., position information of the subject, included in the recognition information obtained in step S2 in the buffer memory 125, for example.

When the main subject is specified in step S9, the process returns to step S2. Then, current recognition information is obtained in step S2, the subject is determined to be present in step S3 (YES), and the main subject is determined to be present in step S5 (YES). Thus, the process proceeds to "setting processing of focusing region depending on main subject" (S6). Details of the processing will be described below with reference to FIG. 5.

The controller 135 repeats the processing of the flowchart illustrated in FIG. 4, for example, at a predetermined cycle. This cycle is called an AF period. The AF period is, for example, a frame period of the captured image Im or its integral multiple.

According to the aforementioned flow, when the subject recognized by the image recognizer 122 is determined to be absent in steps S2 and S3 or the subject recognized by the image recognizer 122 is determined not to be present in the first determination region 30 in steps S2 and S3, the focusing region is set on the multi-point area 41 illustrated in FIG. 2A (S4, S8). Unless the subject is recognized by the image recognizer 122 (YES in S3) and the recognized subject 20 enters the first determination region 30 (YES in S7), the main subject is not specified, and the focusing region is set on the multi-point area 41 fixedly arranged on the captured image Im to perform the focusing operation (S4, S8).

Such control can suppress focusing on the subject 20, even when the subject 20 is recognized on the captured image Im, where the user is likely not to desire focusing of the subject 20, for example, when the recognized subject 20 is present near an edge of the captured image Im. Setting the focusing region on a wide region at the center of the captured image Im and performing the focusing operation based on the focusing region leads to focusing of other objects which the user desires to focus on, such as an object or background present near the center of the captured image Im.

Next, "setting processing of focusing region depending on main subject" of FIG. 4 will be described with reference to the flowchart of FIG. 5. The processing illustrated in the flowchart of FIG. 5 starts with the main subject determined to be present (YES in S5) based on a recognition result (recognition information) of a previous AF period.

As illustrated in FIG. 5, the controller 135 determines whether the main subject was present or not in the first determination region 30 (S10). More specifically, based on the recognition result of the previous AF period, the controller 135 determines whether the main subject was present or not in the first determination region 30. When step S10 is executed for the first time, the main subject should be determined to be present in the first determination region 30 (YES in S10), because the main subject has been specified with the subject 20 present in the first determination region 30 in steps S7 and S9. Then, the process proceeds to step S11.

The controller 135 determines whether a candidate of the main subject is present or not in a second determination region (S11). The candidate of the main subject is, among subjects based on a recognition result of a current AF period, recognized by the image recognizer 122 as the same subject as a subject specifying the main subject in the previous AF period. A moving distance of the subject per AF period is small. Therefore, the candidate of the main subject is a subject close to the main subject based on the recognition result of the previous AF period. The controller 135 determines whether the candidate of the main subject is present or not in the second determination region based on a recognition result of the current AF period.

Similar to the first determination region 30, the second determination region used in step S10 is a region for deciding whether or not the focusing region set on the captured image Im should be depending on the position of the subject 20 at the time of execution of the multi-point AF mode. An example of a second determination region 35 of the present embodiment is illustrated in FIGS. 6A, 6B, and 6C.

Figure 6A:
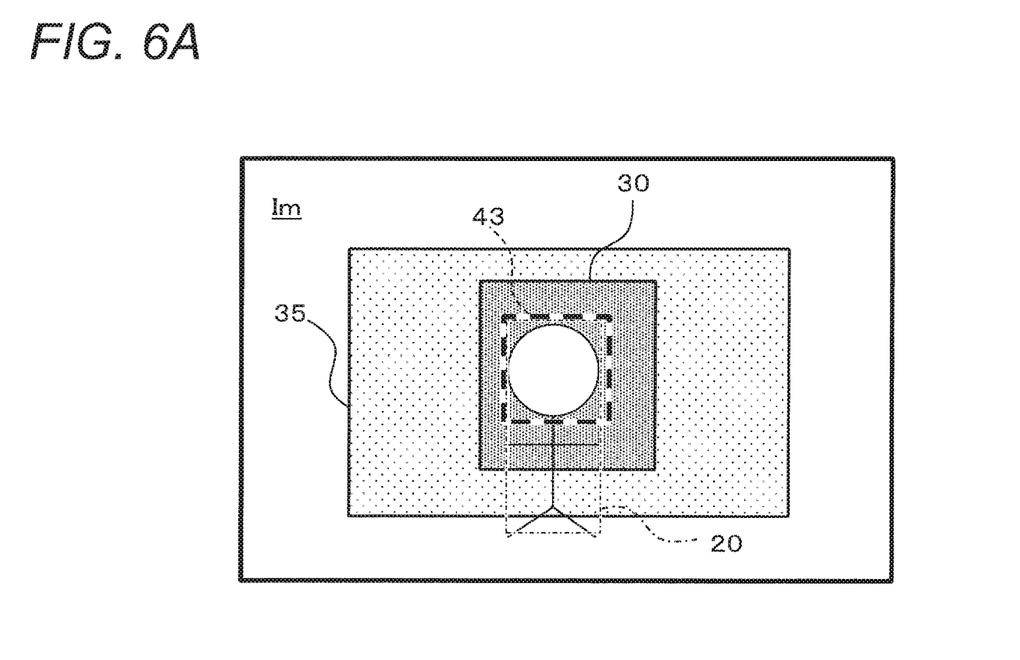
FIGS. 6A, 6B and 6C are views for describing processing of setting a focusing region of the digital camera according to the first embodiment.
Figure 6B:
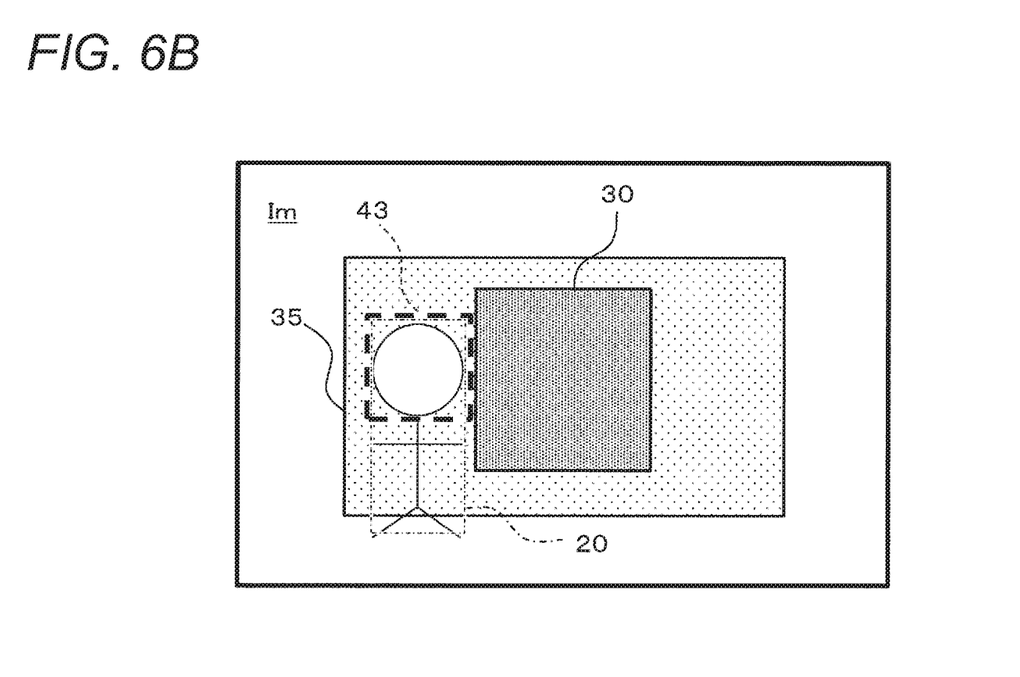
Figure 6C:
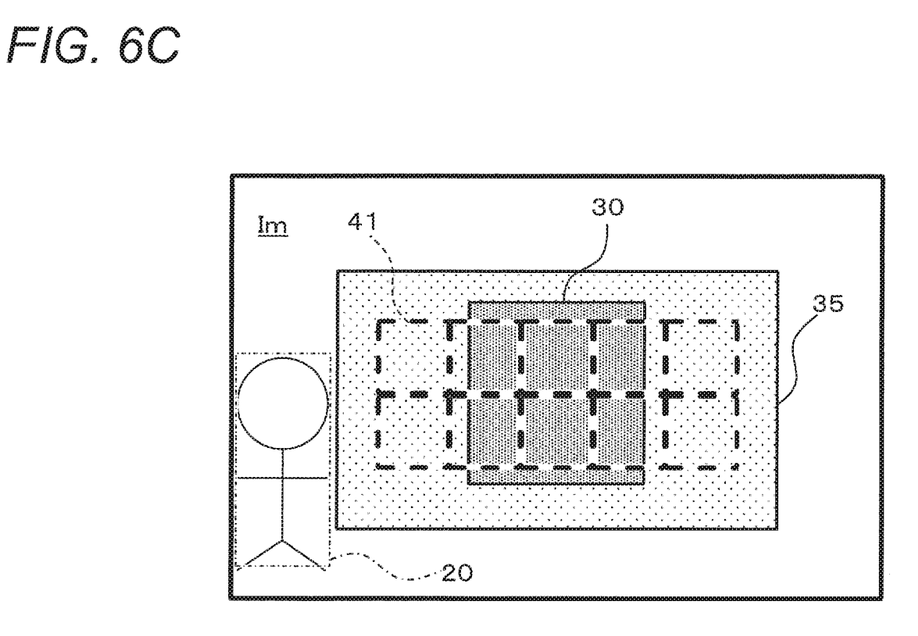

FIG. 6A illustrates an example of the display monitor 130 in which the subject 20, which is a main subject, is present in the first determination region 30. FIG. 6B illustrates an example of the display monitor 130 in which the subject 20 shown in FIG. 6A has moved outside the first determination region 30 and present in the second determination region 35. FIG. 6C illustrates an example of the display monitor 130 in which the subject 20 shown in FIG. 6B has moved outside the second determination region 35.

Similar to the first determination region 30, the second determination region 35 is a region fixedly arranged on the captured image Im. Coordinate information related to the position of the second determination region 35 is preliminarily stored in the flash memory 145, for example. The second determination region 35 of the present embodiment is stored as a region outwardly expanded in a rectangular shape from the first determination region 30 and including the entire first determination region 30. The first determination region 30 includes the center C of the captured image Im. Therefore, the second determination region 35 also includes the center C of the captured image Im.

As will be described below, when the subject 20, which is a main subject, is present in the second determination region 35, the controller 135 uses the subject area 43 as the focusing region to follow the subject 20 and performs the focusing operation based on the subject area 43.

When step S11 is executed for the first time, normally the candidate of the main subject is determined to be present in the second determination region 35 (YES in S11), and the process proceeds to step S13. The controller 135 specifies the main subject with the candidate of the main subject and updates the coordinate of the main subject (S13). More specifically, the controller 135 records the coordinate information related to the candidate of the main subject in the buffer memory 125, for example, as new coordinate information of the main subject.

Furthermore, the controller 135 sets the focusing region depending on a recognition result of the image recognizer 122 and performs the focusing operation based on the focusing region (S14). More specifically, based on the coordinate of the main subject updated in step S13, the subject area 43 corresponding to the main subject is decided, and the focusing region is set on the decided subject area 43 to perform the focusing operation based on the focusing region. When step S14 is executed for the first time, the focusing region is set on the subject area 43 corresponding to the subject 20 in the first determination region 30 as illustrated in FIG. 6A, for example. Then, the process returns to the flowchart illustrated in FIG. 4, and step S2 is executed again.

The position of the main subject on the captured image Im changes with the elapse of time, and the coordinate of the main subject is updated. When the main subject is present in the first determination region 30, steps S2, S3, and S5 of the flowchart of FIG. 4 and steps S10, S11, S13, and S14 of the flowchart of FIG. 5 are repeatedly executed, the focusing region being continuously set on the subject area 43.

When the main subject is present in the first determination region 30, the main subject is positioned at the center of the captured image Im. Therefore, the user is likely to desire focusing on the subject. In such a case, the focusing region is set on the subject area 43 corresponding to the main subject instead of the multi-point area 41 to perform the focusing operation. Thus, even during execution of the multi-point AF mode, the focusing region can be switched to follow the main subject, leading to focusing on a desired subject.

Then, as illustrated in FIG. 6B, the main subject may sometimes go out of the first determination region 30 to an area of the second determination region 35 that is outside the first determination region 30. In this case, the main subject based on the recognition result of the previous AF period is determined to be present in the first determination region 30 (YES in S10), and then the candidate of the main subject based on the recognition result of the current AF period is determined to be present in the second determination region 35 (YES in S11). When step S10 is executed next time, the main subject based on the recognition result of the previous AF period is determined to be present in the area of the second determination region 35 that is outside the first determination region 30 (NO in S10), and the process proceeds to step S12.

The controller 135 determines whether another subject has been present or not in the first determination region 30 for a predetermined period of time or more (S12). Determination in step S12 is performed to achieve automatic switching of the main subject. In the example illustrated in FIG. 6B, a subject different from the subject 20 which is a main subject is not present, and another subject is determined to be absent in step S12. The process proceeds to step S15.

The controller 135 determines whether the candidate of the main subject is present or not in the second determination region 35 (S15). When the candidate of the main subject is determined to be present in the second determination region 35, the process proceeds to step S16. When the candidate is determined not to be present in the second determination region 35, the process proceeds to step S18. When step S15 is executed for the first time, the main subject should be present in the second determination region 35 (YES in S15) unless movement of the main subject is extremely fast, and the process proceeds to step S16.

Similar to step S13, the controller 135 specifies the main subject with the candidate of the main subject and updates the coordinate of the main subject (S16). Similar to step S14, the controller 135 sets the focusing region depending on a recognition result of the recognizer and performs the focusing operation based on the focusing region (S17). The subject area 43 is newly decided based on the coordinate of the main subject updated in step S16, the focusing region is set on the newly-decided subject area 43 to perform the focusing operation. When step S17 is executed for the first time, the focusing region is set on the subject area 43 corresponding to the subject 20 present in the second determination region 35 as illustrated in FIG. 6B, for example. Then, the process returns to the flowchart illustrated in FIG. 4, and step S2 is executed again.

According to the aforementioned flow, even when the main subject goes out of the first determination region 30, as long as the main subject is present in the second determination region 35, steps S2, S3, and S5 of FIG. 4 and steps S10, S12, S15, S16, and S17 of FIG. 5 are repeatedly executed, the focusing region being continuously set on the subject area 43. When the main subject is present in the second determination region 35, the main subject is not so far from the center of the captured image Im, and there is still a large possibility that the user intends to focus on the subject. In such a case, when the subject area 43 corresponding to the main subject is used for the focusing region to perform the focusing operation, the focusing region can be set to follow the main subject, leading to focusing on a desired subject.

Then, the main subject may sometimes go out of the second determination region 35 as illustrated in FIG. 6C. In this case, the main subject based on the recognition result of the previous AF period is determined to be present in the second determination region 35 (NO in S10), and the process proceeds to steps S12 and S15. However, the candidate of the main subject based on the recognition result of the current AF period is determined to be absent in the second determination region 35 (NO in S15), and the process proceeds to step S18. The controller 135 sets the focusing region on the multi-point area 41 instead of the subject area 43 to perform the focusing operation (S18).

When the movement speed of the main subject on the captured image Im is fast, the subject may be moved from a position illustrated in FIG. 6A through a position illustrated in FIG. 6B to a position illustrated in FIG. 6C per AF period. In such a case, the main subject based on the recognition result of the previous AF period is determined to be present in the first determination region 30 (YES in S10), and then the subject 20, which is a candidate of the main subject based on the recognition result of the current AF period, is determined not to be present in the second determination region 35 (NO in S1). In this case, the process proceeds to S18, and the controller 135 sets the focusing region on the multi-point area 41 instead of the subject area 43 to perform the focusing operation.

As illustrated in FIG. 6C, when the main subject is outside the second determination region 35, the user is likely not to desire focusing on the main subject since the main subject is positioned near an edge of the captured image Im. In such a case, the multi-point area 41 fixedly arranged on the captured image Im is used for the focusing region instead of the subject area 43 corresponding to the main subject to perform the focusing operation. This leads to focusing on other objects, such as an object or background, in a wide region including the center of the captured image Im, suppressing focusing on the subject 20.

In the aforementioned processing, once the multi-point AF mode starts, the focusing region is firstly set on the multi-point area 41 fixedly arranged on the captured image Im to perform the focusing operation (S4 of FIG. 4). Then, when the subject 20 on the captured image Im is recognized to be present in the first determination region 30 (S7), the main subject is specified with the recognized subject 20 (S9), and the setting processing of the focusing region depending the specified main subject is performed (S6). Accordingly, the focusing region is set on the subject area 43 instead of the multi-point area 41 to perform the focusing operation (S14 and S17 of FIG. 5). Such control realizes automatic switching to a desired focusing region even during execution of the multi-point AF mode, when the subject 20 is present at the center of the captured image Im, that is the subject 20 should be focused, facilitating focusing on the subject 20.

When the main subject is present in the second determination region 35 including the first determination region 30, the focusing operation is performed with the subject area 43 being used as the focusing region. Thus, the focusing region can be set to follow the main subject, leading to focusing on the subject 20 under circumstances in which the subject 20 should be focused.

Then, when the main subject goes out of the second determination region 35 (FIG. 6C), the focusing region is set on the multi-point area 41 instead of the subject area 43 to perform the focusing operation (S18 of FIG. 5). This suppresses focusing on the subject 20 under circumstances in which the main subject 20 should not be focused.

Next, switching control of a main subject in the flowchart of FIG. 5 will be described with reference to FIGS. 7A, 7B, and 7C.

Figure 7A:
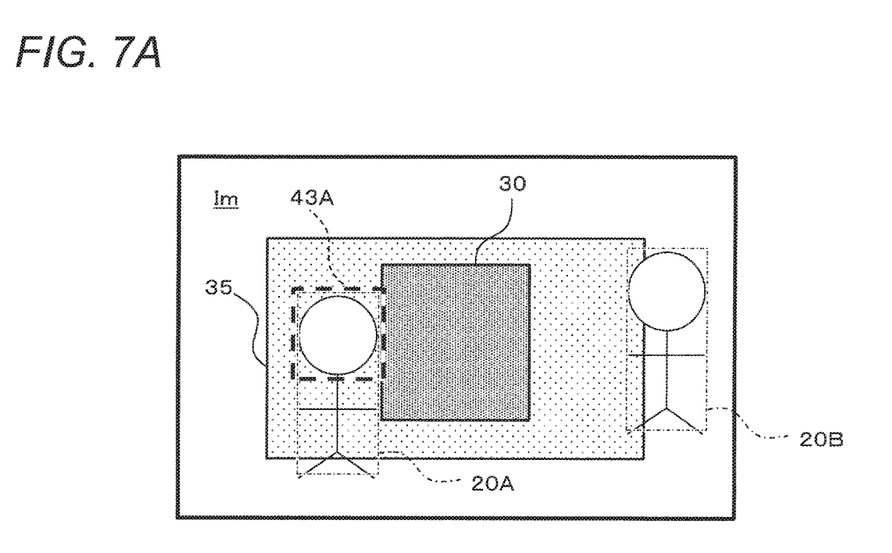
FIGS. 7A, 7B and 7C are views for describing processing of setting a focusing region of the digital camera according to the first embodiment.
Figure 7B:
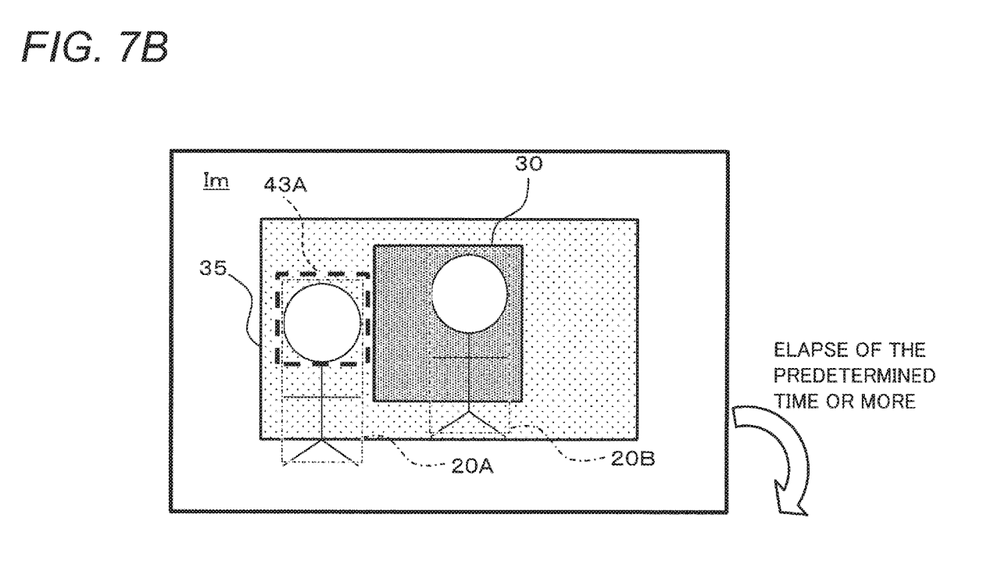
Figure 7C:
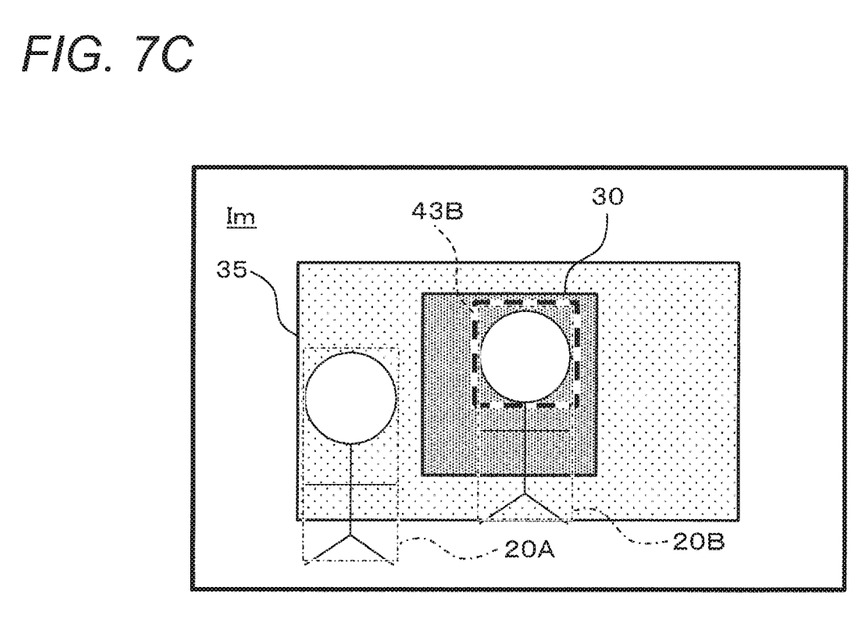

As illustrated in FIG. 7A, when a first subject 20A, which is a main subject, is present in the second determination region 35 and the focusing region is set on a first subject area 43A corresponding to the first subject 20A, a second subject 20B different from the first subject 20A may be recognized. As illustrated in FIG. 7B, when the first subject 20A is present in the area of the second determination region 35 that is outside the first determination region 30 and the second subject 20B enters the first determination region 30, the controller 135 of the present embodiment determines whether or not this state has continued for a predetermined period of time or more (S12). More specifically, it is determined whether or not the state in which the first subject 20A is present in the area of the second determination region 35 that is outside the first determination region 30 and the second subject 20B is present in the first determination region 30 has continued for a predetermined period of time or more.

In the case of YES in step S12, the main subject is newly specified with the second subject 20B that is different from the first subject 20A (S19). Furthermore, as illustrated in FIG. 7C, the focusing region is set on a second subject area 43B corresponding to the second subject 20B specifying the main subject to perform the focusing operation (S20).

Such control realizes switching of the focusing region to specify the main subject preferentially with a subject close to the center of the captured image Im when there are a plurality of subjects 20 recognized on the captured image Im. A subject 20 closer to the center of the captured image Im has more possibility for the user to focus on. Focusing on a more desired subject 20 can be facilitated.

Moreover, elapse of the predetermined period of time is a condition for the determination in step S12, preventing switching of the focusing region and the main subject when the second subject 20B enters the first determination region 30 but soon goes out of the first determination region 30. This prevents unintended switching of the main subject, achieving robust control.

The first subject 20A may return to the first determination region 30 from the position illustrated in FIG. 6B, and then the first subject 20A and the second subject 20B may be both present in the first determination region 30. In such a case, the first subject 20A as the main subject based on the recognition result of the previous AF period is determined to be present in the first determination region 30 (YES in S10), and the process does not proceed to step S12, but to step S11. Then, when the first subject 20A again moves to the area of the second determination region 35 that is outside the first determination region 30 and only the second subject 20B is present in the first determination region 30, the result of the determination in step S10 changes from YES to NO, and the process proceeds to step S12. When the process proceeds to step S12, counting of the predetermined period of time restarts.

The predetermined period of time used in step S12 may be three seconds, for example. The predetermined period of time is not limited thereto, but may be set to any integer multiple of the frame period of the captured image Im.

In the present embodiment, the aforementioned multi-point area 41 and the subject area 43, which are the focusing region, are not displayed on the through image of the display monitor 130. Similarly, the first determination region 30 and the second determination region 35 are not displayed on the through image of the display monitor 130. This prevents the user from being confused by a change in display of the display monitor 130 due to switching of the focusing region. Also, the display monitor 130 becomes easy to see.

[1-3. Effects]

As described above, in the present embodiment, the digital camera 100, which is an example of the imaging device, includes the image sensor 115 (imager), the image recognizer 122 (recognizer), and the controller 135 (controller). The image sensor 115 is configured to capture a subject to generate a captured image Im. The image recognizer 122 is configured to recognize the subject 20 on the captured image Im. The controller 135 is configured to control a focusing operation based on a focus target set on the captured image Im. The controller 135, when the subject 20, which is a main subject, is recognized to be present in the first determination region 30 (S7, S9, S10, and S11) in a state where the focusing region is set on the multi-point area 41 fixedly arranged on the captured image Im (S4, S8), sets the focusing region depending on a recognition result of the image recognizer 122 instead of the multi-point area 41 (S14).

With the aforementioned digital camera 100, when the recognized subject 20 enters the first determination region 30, the focusing region is set depending on the recognition result of the image recognizer 122 instead of the multi-point area 41. This facilitates focusing on the subject 20 under circumstances in which the subject 20 should be focused, setting the focusing region on a desired region depending on the position of the subject 20.

In the present embodiment, the controller 135, in setting the focusing region depending on the recognition result of the image recognizer 122, sets the focusing region to follow the subject 20 within the second determination region 35 including the first determination region 30. Thus, setting the focusing region to follow the subject 20 when the subject 20 is present in the second determination region can facilitate focusing on the subject 20 under circumstances in which the subject 20 should be focused.

Moreover, in the present embodiment, the controller 135, when the subject 20 being followed is recognized not to be within the second determination region 35, sets the focusing region to the multi-point area 41. In this way, the subject 20 which has gone out of the second determination region 35 is not followed, and the focusing region is again set on the multi-point area 41. This prevents the subject 20 from being focused under circumstances in which the subject 20 should not be focused.

Moreover, in the present embodiment, when a state continues for a predetermined period of time or more in which the first subject 20A being followed is within the second determination region 35 and outside the first determination region 30 and the second subject 20B that is different from the first subject 20A is present in the first determination region 30, the controller 135 sets the focusing region to follow the second subject 20B instead of the first subject 20A. Thus, the subject to be followed can be switched at an appropriate timing.

Moreover, the digital camera 100 of the present embodiment includes the multi-point AF mode as a predetermined operation mode for setting the focusing region to the multi-point area 41. When the subject 20 is recognized to be present in the first determination region 30 during execution of the multi-point AF mode, the controller 135 sets the focusing region depending on a recognition result of the image recognizer 122 instead of the multi-point area 41. Thus, switching of the focusing region during execution of the operation mode achieves automatic switching to a desired focusing region, thereby increasing convenience of the user.

Moreover, in the present embodiment, the first determination region 30 includes the center C of the captured image Im. This facilitates focusing on the subject 20 under circumstances in which the subject 20 should be focused, for example, when the subject 20 is present at the center of the captured image Im. Moreover, this prevents focusing on the subject 20 under circumstances in which the subject 20 should not be focused, for example, when the subject 20 is present near an edge of the captured image Im.

Moreover, in the present embodiment, the controller 135, in setting the focusing region to the multi-point area 41, divides the multi-point area 41 into a plurality of regions to be used for the focusing region. In general, such a setting may lead to focusing on unintended object, e.g., background even when the subject is present at the center, but setting the focusing region depending on the recognition result of the image recognizer 122 when the subject 20 enters the first determination region 30 facilitates focusing on the subject 20.

Other Embodiments

As described above, the first embodiment has been described as an example of the technology disclosed in the present application. Not limited thereto, the technology of the present disclosure may be applied to an embodiment for which modification, replacement, addition, or omission has been performed appropriately. Moreover, the constituent elements described in the first embodiment may be combined to create a new embodiment.

In the first embodiment, an example of the operation of the digital camera 100 in the AFC mode has been described (FIGS. 3 and 4). Not limited to the AFC mode, the present disclosure may be applied to an auto focus single (AFS) mode or an auto focus flexible (AFF) mode, for example.

In the first embodiment, the display monitor 130 displays none of the multi-point area 41 and the subject area 43, which are the focusing region, and also none of the first determination region 30 and the second determination region 35. However, the present disclosure is not limited thereto. For example, in the example illustrated in FIGS. 2A and 2B, the display monitor 130 may display at least one of the multi-point area 41, the subject area 43, which are the focusing region, and the first determination region 30.

That is, the digital camera 100 may further include the display monitor 130 (display) configured to display a captured image, and the controller 135 may control the display monitor 130 to display at least one of the focusing region (multi-point area 41 or subject area 43) and the first determination region 30. This increases convenience of the user.

Moreover, the second determination region 35 illustrated in FIGS. 6A to 6C may be displayed on the display monitor 130.

Moreover, in the first embodiment, the digital camera 100 includes the optical system 110 and the lens driver 112. However, the imaging device of the present embodiment may not include the optical system 110 or the lens driver 112, and may be a lens-interchangeable camera, for example.

Moreover, in the first embodiment, the digital camera has been described as an example of the imaging device. However, the present disclosure is not limited thereto. It is sufficient if the imaging device of the present disclosure is an electronic device with image capture function (e.g., a video camera, a smartphone, or a tablet terminal).

As described above, the embodiments have been described as examples of the technology of the present disclosure. For this purpose, the accompanying drawings and the detailed description have been provided.

Therefore, the constituent elements described in the accompanying drawings and the detailed description may include not only constituent elements essential for solving the problem, but also constituent elements not essential for solving the problem for indication of the technology. Therefore, it should not be acknowledged that such unessential constituent elements are essential according to the fact that the unessential constituent elements are described in the accompanying drawings and the detailed description.

Moreover, the aforementioned embodiments are to indicate the technology of the present disclosure. Therefore, various modifications, replacements, additions, omissions or the like may be made within the scope of the claims or equivalents.

The present disclosure is applicable to an imaging device that performs a focusing operation.

What is claimed is:

1. An imaging device comprising:
   an imager configured to capture a subject to generate a captured image;
   a recognizer configured to recognize the subject on the captured image; and
   a controller configured to control a focusing operation based on a focusing region set on the captured image, wherein
   the controller, when the recognizer recognizes the subject on the captured image and the subject is recognized to be present in a first determination region in a state where the focusing region is set on a predetermined region fixedly arranged on the captured image, sets the focusing region on a recognized area of the subject instead of the predetermined region, wherein the first determination region includes a center in the captured image and is a portion of the captured image extending from the center,
   the controller, when the recognizer recognizes the subject on the captured image and the subject is recognized NOT to be present in the first determination region in a state where the focusing region is set on the predetermined region, sets the focusing region depending on the entire predetermined region; and
   wherein the predetermined region includes the center of the captured image and is longer in the lateral direction than the first determination region.

2. The imaging device according to claim 1, wherein the controller, in setting the focusing region depending on the recognition result of the recognizer, sets the focusing region to follow the subject within a second determination region including the first determination region.

3. The imaging device according to claim 2, wherein the controller, when the subject being followed is recognized not to be within the second determination region, sets the focusing region to the predetermined region.

4. The imaging device according to claim 2, wherein when a state continues for a predetermined period of time or more in which a first subject as the subject being followed is within the second determination region and outside the first determination region and a second subject that is different from the first subject is present in the first determination region, the controller sets the focusing region to follow the second subject instead of the first subject.

5. The imaging device according to claim 1, having:
a predetermined operation mode for setting the focusing region to the predetermined region,
wherein
when the subject is recognized to be present in the first determination region during execution of the predetermined operation mode, the controller sets the focusing region depending on the recognition result of the recognizer instead of the predetermined region.

6. The imaging device according to claim 1, wherein the controller, in setting the focusing region to the predetermined region, divides the predetermined region into a plurality of regions to be used for the focusing region.

7. The imaging device according to claim 1, further comprising:
a display configured to display the captured image,
wherein
the controller controls the display to display at least one of the focusing region and the first determination region.

8. The imaging device according to claim 1, wherein the first determination region is preset independently from the recognized area of the subject, to be fixed at the portion of the captured image with the predetermined region including a portion outside the first determination region.

* * * * *